March 3, 1970     B. E. SWADDEY     3,498,284
POST ASSEMBLY FOR OUTDOOR GAS GRILL
Filed Sept. 12, 1968     2 Sheets-Sheet 1
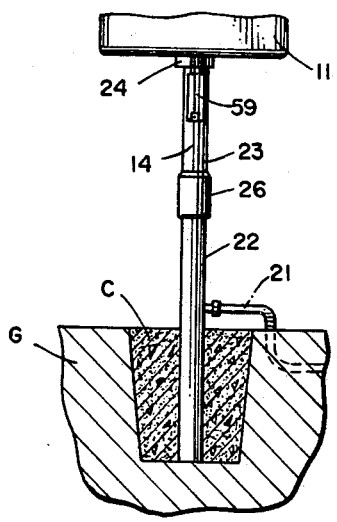
FIG. 1
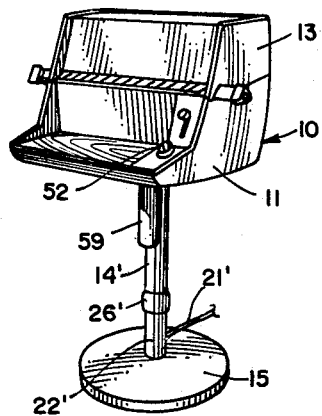
FIG. 1A
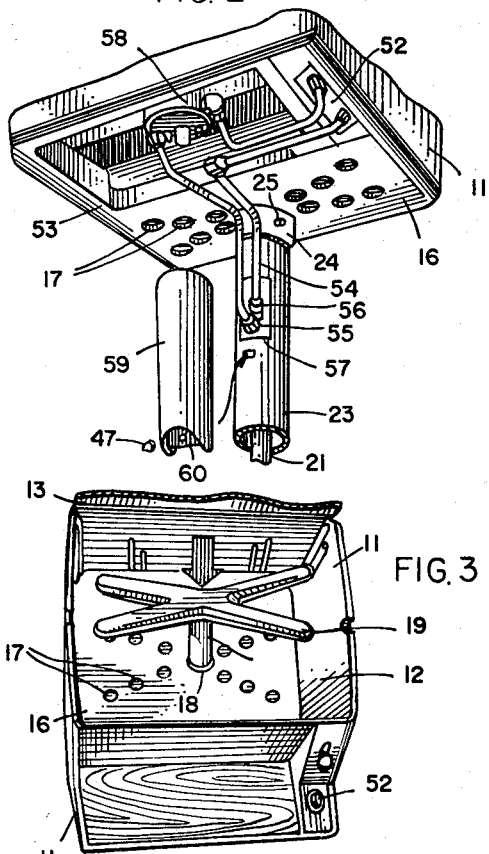
FIG. 2
FIG. 3
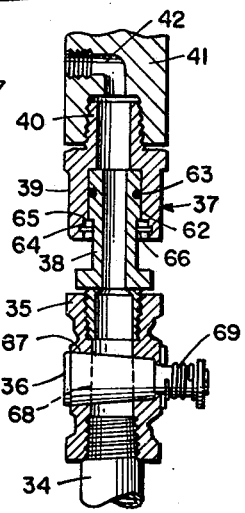
FIG. 7
*INVENTOR:*
BLOND E. SWADLEY
BY
Dawson, Tilton, Fallon & Lungmus
ATT'YS

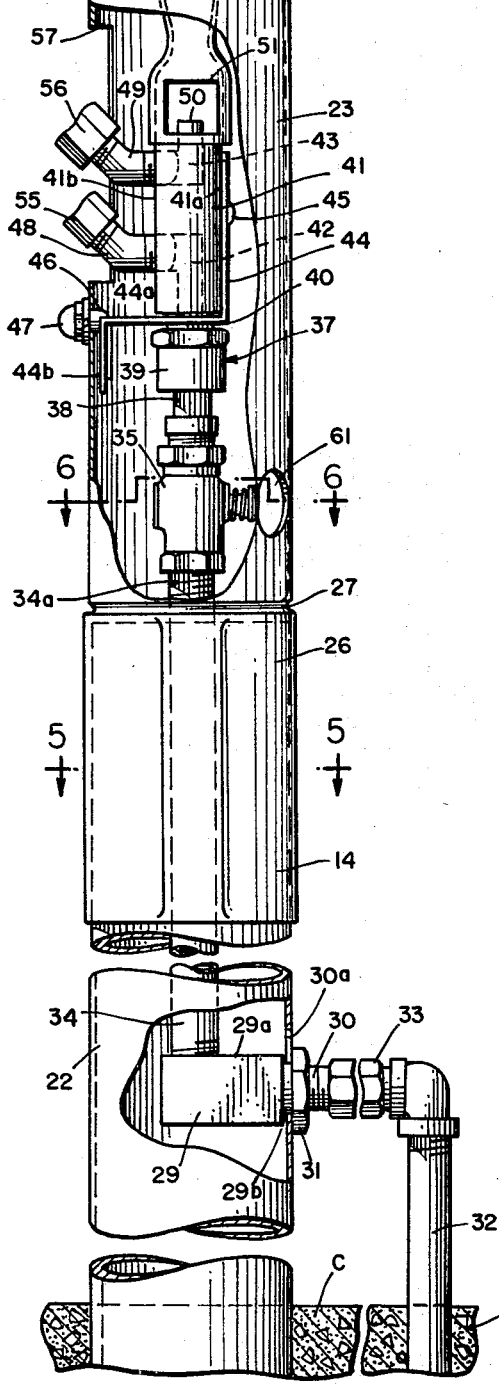
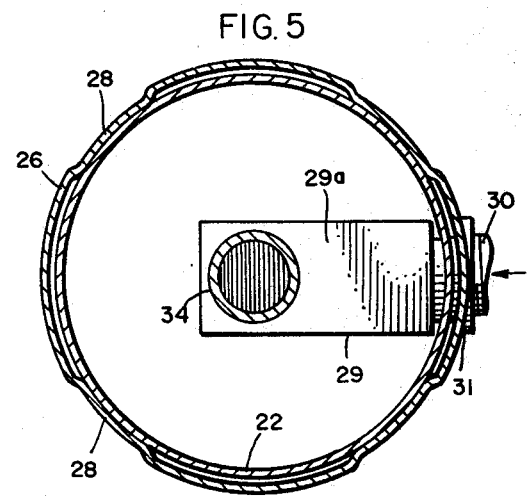
FIG. 4
FIG. 5
FIG. 6
INVENTOR:
BLOND E. SWADLEY
BY
Dawson, Tilton, Fallon & Lungmus
ATT'YS

United States Patent Office 3,498,284
Patented Mar. 3, 1970

3,498,284
POST ASSEMBLY FOR OUTDOOR GAS GRILL
Blond E. Swaddey, Wichita, Kans., assignor to The Coleman Company, Inc., Wichita, Kans., a corporation of Kansas
Filed Sept. 12, 1968, Ser. No. 759,301
Int. Cl. A47j 37/07; F24b 3/00
U.S. Cl. 126—41                                  13 Claims

ABSTRACT OF THE DISCLOSURE

An outdoor gas grill is provided with a support post which permits the grill to rotate freely and which permits ready access to the gas supply pipe within the post for inspection and maintenance. The casing of the gas grill is supproted by the upper portion of a two-part cylindrical support post, and one of the upper and lower post portions is slidably and rotatably received by the other. A gas supply pipe extends transversely through the wall of the lower post portion and then extends upwardly generally axially within the post. A gas manifold is rotatably joined to the gas supply pipe by a swivel connection and is attached to the upper post portion for rotation therewith. The grill casing carries a control valve which is interposed in the gas supply line by a supply tube which extends from the manifold to the control valve and by a return tube which extends from the control valve to the manifold. The return tube communicates with a gas orifice which is received by the venturi end of the gas burner carried by the grill casing.

BACKGROUND

This invention relates to outdoor grills, and, more particularly to outdoor grills which use gas as fuel.

Outdoor cooking on grills or broilers has become increasingly popular in recent years. Originally, charcoal was principally used as the fuel to cook the food, but the use of gas as a fuel is becoming widespread. Gas grills conventionally include a casing providing a cooking enclosure which may be covered by a top hingedly joined to the casing. A gas burner is mounted in the lower portion of the casing enclosure, and a grate is mounted over the burner for supporting non-combustible coals, such as ceramic briquettes or a natural rock. The casing is generally centrally supported by an elongated support post which in turn may be supported either in the ground or by a base. If the support post is buried in the ground, the grill becomes a relatively permanent installation, while a grill having a base can be moved from place to place without too much difficulty.

The fuel gas, such as natural gas or liquid petroleum gas, is conveyed from the gas source to the gas burner by means of a gas supply pipe, which generally enters the support post adjacent the bottom thereof and extends upwardly within the post to the gas burner. By locating the gas supply pipe within the post, the pipe is both hidden from view and protected from damage.

It is desirable that the grill casing be rotatably supported by the support post so that it may be turned to any desired position. For example, outdoor furniture or the like may interfere with the cook when the grill is in one position, or the wind may shift and blow smoke in the cook's face.

It is also desirable that gas control means be provided on the casing at a convenient height to permit the cook to control the gas flame while looking at the gas burner, and the gas control means should not interfere with the rotatability of the casing.

From time to time it may be necessary to inspect the gas supply pipe within the support post to check for gas leaks, to replace valve components, or the like, and it is desirable that the gas supply pipe be readily accessible.

SUMMARY

I have provided a post assembly which supports the grill casing for free rotation throughout a full 360°. The support post includes upper and lower portions which are rotatably and slidably joined, and the upper portion of the gas supply pipe, which is releasably anchored to the upper post portion, is rotatably joined to the remainder of the gas supply pipe by a swivel connection. A gas control valve may be mounted on the casing and connected to the upper portion of the gas supply pipe by tubing, and the valve and tubing rotate with the casing. When access to the gas supply pipe is desired, the upper portion of the gas supply pipe may be disconnected from the upper post and the upper post may be slidably separated from the lower post to expose the gas pipe.

DESCRIPTION OF THE DRAWING

The invention will be explained in conjunction with an illustrative embodiment shown in the accompanying drawing in which—

FIG. 1 is a fragmentary elevational view, partly in section, showing the post assembly supported by the ground;

FIG. 1A illustrates a modified form of the post assembly which is supported by a base;

FIG. 2 is a fragmentary perspective view showing the bottom of the grill casing;

FIG. 3 is a fragmentary perspective view of the grill enclosure showing the gas burner being inserted;

FIG. 4 is a fragmentary elevational view, partially in section, of the post assembly;

FIG. 5 is a sectional view taken along the line 5—5 of FIG. 4;

FIG. 6 is a section view taken along the line 6—6 of FIG. 4; and

FIG. 7 is an enlarged sectional view of a portion of FIG. 4.

DESCRIPTION OF SPECIFIC EMBODIMENT

Referring now to FIGS. 1–3, a gas grill designated generally by the numeral 10 includes a grill casing 11, which provides a cooking enclosure 12 (FIG. 3), and a top 13 which is hingedly connected to the casing 11. The casing illustrated in FIG. 1 is supported by a post assembly 14 the lower end of which is encased in concrete C which is poured into a suitable hole in ground G. The casing 11 illustrated in FIG. 1A is supported by a post assembly 14' which is secured to a base 15.

The bottom 16 of the casing 11 is provided with ventilation openings 17 and a gas burner opening 18. A generally X-shaped gas burner 19 which includes a venturi pipe 20 is positioned within the cooking enclosure 12, and the venturi pipe 20 is inserted through the opening 18 in the casing. Fuel gas is supplied to the venturi pipe 18 by means of gas supply pipe 21.

The post assembly 14 illustrated in FIG. 1 is permanently supported by the ground and concrete, and the gas supply pipe 21 extends outwardly from the post assembly and then downwardly into the ground to remain buried as it extends to the gas supply. If desired, the gas supply pipe may be completely buried by filling the concrete C to a level below the ordinary ground level so that the gas supply pipe may enter the post assembly below ground level.

The post assembly 14' illustrated in FIG. 1A is not permanently supported in the ground, and the gas supply pipe 21' extends above ground level.

Referring now to FIGS. 4–6, the support post 14 is seen to be generally cylindrical and includes separate lower and upper post portions 22 and 23, respectively.

The upper end of the upper post 23 is received by a cylindrical collar 24 depending from the bottom of the casing 11 and may be secured therein by screw 25 (FIG. 2).

The upper post 23 is provided with an expanded portion 26 adjacent the lower end thereof which has an inside diameter slightly larger than that of the remainder of the post 23. The upper end of the lower post 22 is slidably and rotatably received by the expanded portion 26 of the upper post, and the upper end of the post 22 bears against an inwardly extending perimetric shoulder 27 formed in the upper post 23 at the top of the expanded portion. The shoulder 27 acts as a stop to prevent excessive relative sliding movement between the post portions 22 and 23.

Referring to FIG. 5, the expanded portion 26 of the upper post is provided with a plurality of circumferentially spaced inwardly extending lands 28 which have a radius of curvature of approximately the same as that of the outside surface of the lower post 22. The remainder of the expanded portion 26 is spaced outwardly from the outer surface of the lower post. The lands 28 extend longitudinally for almost the entire length of the expanded portion and firmly support the top post 23 on the bottom post 22 while decreasing the area of contact between the upper and lower posts, thereby facilitating relative rotation of the posts. In one specific embodiment the outside diameter of both the upper and lower posts was approximately 3 inches, the inner surface of the lands 28 extended along a radius from the center of the upper post of about 1.5075 inches, and the remainder of the inner surface of the expanded portion extended along a radius of about 1.539 inches. The longitudinal length of the expanded portion was approximately 4½ inches, and the shoulder 27 extended inwardly to provide a minimum internal diameter of approximately 2¾ inches.

The gas supply pipe 21 includes a transversely extending pipe 29 which is provided with a threaded connecting end 30 which extends outwardly through an opening provided in the wall of the lower post 22 adjacent the top of the concrete C. The transverse pipe 29 is secured to the wall of the lower pipe 22 by nut 31, but the nut does not prevent rotation of the pipe 29 about its longitudinal axis. The ground pipe 32 is suitably connected to the threaded end 30 as by connecting nut 33, and extends downwardly to the ground G and is connected to the gas supply.

In the particular embodiment illustrated, the transverse pipe 29 is generally block-like in shape and includes a flat upper surface 29a and a perimetric shoulder 29b which abuts the wall of the post 22. The surface 29a is provided with an internally threaded opening which threadedly receives an elongated axially extending pipe 34 which extends upwardly through the lower post 22 and terminates in a threaded end portion 34a above the upper end of the post 22. A conventional gas shut-off valve 35 is threadedly engaged with the upper end of the axially extending pipe 34 and includes a slotted valve stem 36 (FIGS. 4 and 6).

A gas pipe swivel assembly 37 is threadedly engaged with the upper end of the shut-off valve 35 and includes a stationary stem portion 38 which is threaded into the valve 35 and a rotating collar portion 39 which includes an outwardly extending threaded connecting end 40.

A gas manifold 41 is threaded onto the connecting end 40 and is provided with a pair of internal right-angle passages 42 and 43. The gas manifold 41 is generally rectangular in horizontal cross section and includes opposed flat surfaces 41a and 41b. A right-angle anchoring bracket 44 is attached to the flat side 41a of the manifold by screw 45, and the horizontally extending leg 44a of the anchoring bracket is provided with an opening which receives the connecting end 40 of the swivel assembly. The outer end of the horizontal leg 44a includes a downwardly extending flange 44b which carries outwardly extending bolt or screw means 46 which is welded or otherwise suitably secured to the flange 44b. The bolt 46 extends through an opening in the wall of the upper post 23 and receives a nut 47 to anchor the gas manifold 41 to the post 23.

The horizontal portions of the right-angle passages 42 and 43 of the manifold are internally threaded and receive connecting elbows 48 and 49, respectively, and the upper end of the manifold includes an upwardly extending gas outlet or orifice 50 which communicates with the internal passage 43. The venturi 20 of the gas burner 19 extends downwardly through the opening 18 provided in the bottom of the casing 11, and the lower end of the venturi receives the gas orifice 50. The venturi is provided with a suitable air intake opening 51 adjacent its bottom end.

Referring to FIGS. 2 and 3, a conventional gas control valve 52 is mounted in the shelf portion 11a of the casing and is located at a convenient height for the cook. The gas flows through the gas control valve 52 before it reaches the venturi 20 by means of supply tube 53 and return tube 54. The supply tube 53 is releasably connected to the elbow 48 on the manifold by connecting nut 55, and the return tube 54 is connected to elbow 49 by connecting nut 56. A elongated generally rectangular opening 57 is provided in the wall of the upper post 23 to permit these connections, and the ends of the elbows may extend through the opening 57 slightly beyond the wall of the post 23. If natural gas is used as the fuel, a gas regulator 58 may be carried by the casing 11 and interposed in the supply tube 53. If liquid petroleum gas is to be used as the fuel, the regulator 58 need not be used.

A generally semi-cylindrical cover 59 (FIG. 2) is removably secured to the upper post 23 to protect the gas tubes 53 and 54 which extend outwardly from the post. The cover 59 is illustrated in FIG. 2 before it is positioned, and includes a downwardly extending flange 60 provided with a suitable opening which receives the bolt 46 carried by the anchor bracket 44. The nut 47 which secures the anchor bracket also secures the cover 59.

Referring to FIGS. 4 and 6, an access opening 61 is provided in the wall of the upper post 23 at the level of the slotted valve stem 36 of the gas shut-off valve so that the shut-off valve may be opened and closed when desired.

The details of the swivel assembly 37 and shut-off valve 35 can be seen in FIG. 7. The stem portion 38 which is threadedly received by the shut-off valve 35, is rotatably received within an enlarged axial bore 62 provided in the rotating collar 39. The upper end of the stem 38 is provided with an annular recess which carries O-ring 63 so that a gas tight seal is maintained between the parts 38 and 39. A brass thrust washer 64 bears against a radially outwardly extending shoulder 65 on the stem 38, and retaining ring 66, which is received in an annular recess in the collar 39, prevents axial movement of the parts 38 and 39 relative to each other.

The valve stem 36 is generally frusto-conical and is received in a correspondly shaped bore 67 extending transversely through the valve body. The valve stem is provided with a gas-flow passage 68, and spring 69 urges the valve stem into sealing engagement with the walls of bore 67.

OPERATION

As is apparent from the foregoing description, the casing 11 and upper post 23 may be freely rotated with respect to the fixed post 22. The gas manifold 44 is anchored to the post 23, and the swivel assembly 37 permits the gas manifold and the tubes 48 and 49 which connect the gas manifold to the gas control valve 52 to rotate with the casing and post 23. The gas shut-off valve 35 and axially extending pipe 34 do not rotate, however, and remain fixed relative to the transverse gas pipe 29 which is secured to the lower post 22.

When the grill is to be used, and the casing and upper post 23 are rotated until the access opening 61 is aligned with the valve stem 36 of the shut-off valve 35, and the valve may be opened by means of a screw driver or similar tool. The gas flows past the shut-off valve and through the swivel assembly 37 and the internal passage 42 of the gas manifold into the supply tube 53. The flow of gas is regulated by means of the gas control valve 52, which may be operated while the cook is standing and viewing the gas burner. The gas returns from the gas control valve to the manifold 41 through the return tube 54 and flows through the internal passage 43 and gas orifice 50 into the venturi 20 of the gas burner. The gas may then be ignited by a match or spark.

When the grill is being used, the casing may be rotated freely throughout a full 360° and more, and the gas flame may be controlled by the gas control valve.

After the food has been cooked, the gas flow may be shut off by means of the gas control valve 52. If the grill is not to be used again for some time, the gas shut-off valve should preferably be closed also. The casing and upper post 23 are rotated until the access hole 61 aligns with the slotted valve stem 36, and the shut-off valve may be closed by a screwdriver. If desired, the access opening 61 may then be rotated out of alignment with the valve stem 36 so that children or vandals will not be tempted to open the gas line.

From time to time it may be desirable to examine the various connections in the gas line for leaks, or the gas shut-off valve may need servicing or replacement. Access to the gas supply pipe is greatly facilitated by my post assembly. The nut 47 which holds the cover 59 is removed, and the return and supply tubes 53 and 54 are disconnected from the elbows 48 and 49. The screw 25 which secures the collar 24 of the grill casing to the upper post 23 is removed or loosened, and the grill casing may then be readily lifted from the support post. The gas manifold 41 is then pushed away from the opening 57 by pushing the elbows 48 and 49 until the bolt 46 is withdrawn from its associated opening in the post 23 and the elbows are positioned entirely within the post.

Although the pipes 34 and 29 are relatively rigid and inflexible, movement of the manifold is permitted by a slight flexing of the relatively thin wall of the lower post adjacent the threaded connecting end 30. It will be appreciated that the upper end of the axially extending pipe 34 need swing away from the opening 57 only a short distance to remove the bolt 46 from its opening and that the corresponding movement of the threaded connecting end 30 is much less due to the substantial difference in the lengths of the pipes 29 and 34. The wall of the post 22 may be of the order of 0.049 inch, and flexing of the wall adjacent the opening for the connecting end 30 of the pipe 29 may be further facilitated by extending the opening longitudinally along the pipe wall for a short distance as at 30a in FIG. 4. The transverse dimension of the opening, however, is approximately the same as the diameter of the connecting end 30, and the pipe 29 is securely attached to the post wall by the nut 31. After the bolt 46 and elbows 48 and 49 are positioned entirely within the upper post, this post may be pulled upwardly to remove the expanded portion 26 from the upper end of the lower post 22.

Alternatively, rather than withdrawing the nut 46 from the post 23 by flexing the wall of post 22, the upper post may be rotated until the horizontal leg portion 44a of the anchor bracket 44 extends generally perpendicularly with respect to the transverse pipe 29 of the gas supply pipe. The gas manifold 41 may then be pushed away from the opening 57 in the upper post 23, and this movement is permitted by rotation of the transverse pipe 29 within its associated opening in the wall of the lower post 22. Rotation of the upper end of the pipe 34 away from the opening 57 withdraws the bolt 46 from its opening in the upper post and moves the outer ends of the elbows 48 and 49 within the wall of the upper post. The upper post 23 may then be removed from the lower post 22.

When the upper post 23 is removed, the shut-off valve 35, which is positioned above the upper end of the post 22, is readily accessible and can be replaced without difficulty. Similarly, the connections to the shut-off valve, swivel assembly, and manifold can be easily checked for leaks.

If it is desired to check the connection between the axially extending pipe 34 and transverse pipe 29, it is merely necessary to unscrew the connecting nut 33 and nut 31 so that the threaded connecting end 30 may be withdrawn from its opening in the lower post. The pipes 29 and 34 may then be lifted completely from the lower post.

When the post assembly is to be reassembled, the reverse procedure is followed. The upper post 23 is inserted over the upper end of the lower post, and the bolt opening in the upper post is aligned with the bolt 46. The elbows 48 and 49 may then be pulled outwardly through the opening 57 to push the bolt 46 through its associated opening, and the supply and return tubes 53 and 54 may be reattached.

Although in the particular embodiment illustrated, I have described the gas control knob 52 as being mounted on the casing 11, it may also be mounted on the upper post 23 so that the supply and return tubes 53 and 54 and their associated elbows 48 and 49 may be eliminated.

The post assembly 14′ illustrated in FIG. 1A operates in the same manner, the only difference being that the lower post 22′ is shorter than the lower post 22 and is attached to the base 15 rather than being buried in the ground.

While in the foregoing specification, I have described a specific embodiment of my invention in considerable detail for the purpose of illustration, it is to be understood that many of the details herein given may be varied considerably by those skilled in the art without departing from the spirit and scope of my invention.

I claim:
1. In a gas grill having a casing providing a cooking enclosure and a gas burner within the casing,
 a hollow post for supporting said casing, said post having an upper portion and a lower portion, one of said portions being slidably received by the other,
 a gas supply pipe having an inlet portion extending through the lower post portion, a central portion extending generally axially within said post, and an outlet portion communicating with said gas burner,
 means on said gas supply pipe extending through an opening in said post upper portion for removably anchoring said supply pipe to the upper post portion, said gas supply pipe being movable away from the opening in the upper post portion to withdraw said anchoring means from said opening whereby said upper and lower post portions may be slidably separated.

2. The gas grill of claim 1 wherein the inlet portion of the gas supply pipe extends generally transversely through an opening in the wall of the lower post portion and the central portion extends generally perpendicularly from the inlet portion, said inlet portion being rotatably secured to the wall of the lower post portion, said anchoring means including screw means extending through the opening in the upper post portion, said screw means being swingable away from the opening by rotation of said inlet portion with respect to the wall of the lower post portion.

3. The gas grill of claim 2 wherein the inlet portion and the central portion of the gas supply pipe are relatively rigid and remain fixed relative to each other as the inlet portion rotates.

4. The gas grill of claim 1 wherein said upper post portion may rotate with respect to the lower post portion, the central portion of said gas supply pipe including a swivel below said anchoring means whereby a portion of said gas supply pipe may rotate with the upper post portion.

5. The gas grill of claim 4 wherein said swivel is located above the upper end of the lower post portion, valve means on said gas supply pipe between the swivel and the upper end of the lower post portion, said upper post portion including a second opening in general horizontal alignment with said valve means whereby rotation of said upper post may bring said second opening into alignment with said valve means to provide access thereto.

6. The gas grill of claim 1 wherein the inlet portion and the central portion of the gas supply pipe are relatively rigid, said inlet portion extending generally transversely through an opening in the wall of the lower post portion, said central portion extending generally perpendicularly from the inlet portion and being fixed thereto, said central portion including a swivel below said anchoring means whereby a portion of said gas supply pipe may rotate with the upper post portion, said anchoring means including screw means extending through the opening in the upper post portion, said screw means being movable away from the opening by movement of said inlet portion with respect to the wall of the lower post portion.

7. In a gas grill having a casing providing a cooking enclosure and a gas burner within the casing, a hollow post for supporting said casing, said post having an upper portion and a lower portion, one of said portions being slidably and rotatably received by the other, a gas supply pipe extending generally axially within said post and communicating with said gas burner, said gas supply pipe having an upper portion and a lower portion joined by a swivel connection whereby said upper and lower portions may rotate with respect to each other and said casing and upper post portion may rotate with respect to said lower post portion.

8. The gas grill of claim 7 including gas control means on said casing, first tube means extending from the upper portion of the gas supply line to the gas control means, and second tube means extending from the gas control means to the gas burner, whereby the flow of gas to the gas burner may be controlled.

9. The gas grill of claim 8 including a gas manifold on the upper portion of the gas supply pipe, said gas manifold having an outlet communicating with the gas burner, said first and second tube means extending from said manifold and communicating with, respectively, the gas supply pipe and the manifold outlet.

10. The gas grill of claim 7 including means on said gas supply pipe extending through an opening in said upper post portion for removably anchoring said supply pipe to the upper post portion, said gas supply pipe being movable away from the opening in the upper post portion to withdraw said anchoring means from said opening whereby said upper and lower post portions may be slidably separated.

11. In a gas grill having a casing providing a cooking enclosure and a gas burner within the casing,
a generally cylindrical, hollow post for supporting said casing, said post having an upper portion and a lower portion, one of said portions being slidably and rotatably received by the other,
a gas supply pipe having
 (i) an inlet portion extending generally transversely through an opening in the wall of the lower post portion and being rotatably secured to the wall of the lower post portion,
 (ii) an axial portion extending generally axially within said post, said axial portion having an upper portion and a lower portion joined by a swivel connection whereby said upper and lower portions may rotate with respect to each other,
screw means carried by said lower portion of the gas supply pipe, said screw means extending through an opening in the upper post portion and removably securing the gas supply pipe to the upper post portion,
gas control means on said casing,
first tube means extending from said upper portion of the gas supply pipe to the gas control means,
and second tube means extending from the gas control means to the gas burner whereby the flow of gas to the gas burner may be controlled,
said casing and gas control means being rotatable with respect to the lower post portion and the inlet portion of the gas supply pipe.

12. The gas grill of claim 11 wherein said lower portion of the gas supply pipe extends above the upper end of the lower post portion and includes valve means, said upper post portion being provided with a second opening therethrough in general horizontal alignment with said valve means whereby rotation of said upper post may bring said second opening into alignment with said valve means to provide access thereto.

13. The gas grill of claim 11 wherein said upper portion of the axial portion of the gas supply pipe includes a gas manifold, said gas manifold having an outlet communicating with the gas burner and being provided with a first internal passage communicating with the remainder of the axial portion and a second internal passage communicating with the outlet, said first and second tube means being connected, respectively, to said first and second internal passages.

References Cited

UNITED STATES PATENTS

| | | | |
|---|---|---|---|
| 3,244,163 | 4/1966 | McGlaughlin | 126—25 |
| 3,251,355 | 5/1966 | Keating | 126—41 X |
| 3,298,361 | 1/1967 | Clark | 126—25 |
| 3,386,432 | 6/1968 | Hanson | 126—41 |

CHARLES J. MYHRE, Primary Examiner